United States Patent [19]

Mouille et al.

[11] 4,274,510

[45] Jun. 23, 1981

[54] MULTI-DIRECTIONAL SUSPENSION MEANS FOR ROTOR AIRCRAFT

[75] Inventors: Rene L. Mouille, Aix en Provence; Edwin Ortega, Marseilles, both of France

[73] Assignee: Societe Nationale Industrielle Aerospatiale, Paris, France

[21] Appl. No.: 21,778

[22] Filed: Mar. 19, 1979

[30] Foreign Application Priority Data

Mar. 20, 1978 [FR] France ................................. 78 08001
Nov. 15, 1978 [FR] France ................................. 78 32281

[51] Int. Cl.³ ...................... B64C 27/00; B64D 27/00
[52] U.S. Cl. ...................................... 188/1 B; 74/574; 244/17.27; 244/54; 248/568; 248/605; 416/500
[58] Field of Search ............... 244/17.11, 17.27, 54; 188/1 B; 248/561, 562, 564, 567, 556, 557, 568, 605; 74/574, 586; 416/500, 244 R, 134; 267/140, 141, 63 A, 35

[56] References Cited

U.S. PATENT DOCUMENTS

| | | | |
|---|---|---|---|
| 2,060,604 | 11/1936 | Bartlett | 248/557 |
| 2,129,124 | 9/1938 | Geyer | 248/568 |
| 2,739,769 | 3/1956 | Rogers | 244/17.27 |
| 3,502,290 | 3/1970 | Legrand et al. | 244/17.27 |
| 3,920,202 | 11/1975 | Mouille | 244/17.27 |
| 3,921,940 | 11/1975 | Mouille | 244/17.27 |
| 4,014,484 | 3/1977 | Mouille | 244/17.27 |

FOREIGN PATENT DOCUMENTS

687705  1/1940  Fed. Rep. of Germany ............. 244/54

Primary Examiner—Galen L. Barefoot

[57] ABSTRACT

Suspension means for mechanical elements which have a plate rigid with an element which is to be suspended. The rigid plate is connected to fixed mountings by flexible studs working in compression and by a deformable articulated system composed of connecting rods and a floating cross-member, ensuring rotationally rigid connection and providing for absorption of a torque originating from the suspended element, while allowing the element to perform translatory movements.

14 Claims, 10 Drawing Figures

MULTI-DIRECTIONAL SUSPENSION MEANS FOR ROTOR AIRCRAFT

The present invention relates to a system for the multi-directional suspension of a member carried by a support in a fixed structure and exposed to vibrations which have to be damped and to torque which has to be absorbed, such as the main transmission housing of a rotor aircraft. In rotor aircraft, such as a helicopter, it is necessary to damp vibrations between, on the one hand, the assembly consisting of the main rotor carried by the main transmission housing and, on the other, the fuselage (constituting the fixed structure), and to transmit between the transmission housing and the fuselage the reactive torque created by the rotor being rotated. It is necessary to damp vibrations between, on the one hand, the assembly consisting of the main rotor carried by the main transmission housing and, on the other, the fuselage (constituting the fixed structure), and to transmit between the said transmission housing and the said fuselage the reactive torque created by the rotor being driven to revolve.

Despite precautions taken, during the planning for the construction of a rotor aircraft and during the laboratory tests which accompany it, in order to avoid structural resonance the first flight tests of the rotor aircraft sometimes reveal a high level of vibration. This manifests itself particularly by shaking of the structure, that is to say of the fuselage, which is most upsetting to the piloting of the aircraft and the comfort of the passengers carried. Therefore, the problem resides in finding functional solutions capable of damping vibrations between the fuselage and the complex which comprises the transmission, the mast and the rotor.

The applicants have found on the one hand that the mounting of the base of the main transmission housing on the fuselage played a considerable and fundamental role and, on the other, that by introducing a certain flexibility into the said mounting, it was possible to improve the dynamic response of the structure, reducing its level of vibratory excitation. Thus, French Pat. No. 507 306, corresponding to U.S. Pat. No. 3,502,290, in the name of the applicants proposes a flexible connecting means between the rotor and the fuselage of the helicopter, consisting of a plane plate of titanium or titanium alloy correctly cut away to form a resilient assembly having parallel blades, that is to say a grille when the flexibility required is uni-directional, or two intersecting grilles connected to each other when it has to be bi-directional. This plate, makes it possible to dampen vibrations emanating from the rotor, is fixed to the bottom of the casing of the main gear box which is supported by an assembly of inclined bars connected to the top part of the said gear box on the one hand and to the fuselage on the other.

The high cost of such a connecting means motivated the applicants to propose, in their French Pat. No. 73/16 475, corresponding to U.S. Pat. No. 3,920,202, a means of suspension between gear box and fuselage of a helicopter comprising a flat plate having oppositely disposed shoulders for receiving flexible elements for connection to a rigid frame which likewise provides flexible links with the structure of the fuselage. Preferably, the flat plate is a light alloy ring rigid with the bottom of the main gear box casing, while the rigid frame consists of two other flat rings concentric with the first.

With a view to improving the damping of vibrations emanating from the rotor and extending towards the fuselage of a helicopter and to providing the cabin of such an aircraft with a very low level of vibration in order to enhance the comfort of the occupants and the speed of the machine, the object of the present invention is a means for multidirectional suspension comprising a flexible connection between the rotor and the fuselage of a helicopter in order to damp excitations originating from the rotor head. This device, inexpensive and generally applicable to the suspension of any member carried in a fixed structure exposed to torque about an axis and to vibration forces in directions at right-angles to this axis, is characterised in that it comprises a plate rigid with the suspended member and located in a plane substantially at right-angles to the axis, an assembly of rotationally rigid connecting elements between the plate and the structure ensuring absorption of the torque on the structure, and an assembly of elements for flexible translatory connection between the plate and the structure allowing the plate to perform movements of limited extent in any direction in its plane.

Advantageously, the rotationally rigid connecting elements are distributed around the plate in two identical groups disposed symmetrically in relation to the axis, these two groups of elements of the same general nature being mutually linked by a diametral rigid floating cross-member, that is to say one which is located parallel with the plane of the plate and extends radially on either side of the axis. Each of these groups comprises preferably a first connecting element mounted between the plate and the cross-member and a second connecting element mounted between the cross-member and a fixed mounting, that is to say one which is rigid with the structure, this second element being advantageously constituted by an articulated rod.

Furthermore, the elements for flexible translatory connection preferably comprise two sets of flexible and elastic elements of suitable stiffness which allow the web to perform movements in a first direction at right-angles to the axis—for the first set—and in a second direction at right-angles to the axis and to the first direction—for the second set, the elements in each set being identical or different but disposed symmetrically in relation to the axis.

According to the invention, the two functions—absorption of the torque and elastic suspension—are separated and are fulfilled by two different assemblies of connecting elements, one ensuring rotationally rigid connection while an ability to undergo deformation allows a freedom of translatory movement, the other ensuring a flexible translatory connection of a multidirectional nature and having clearly defined degrees of stiffness in each of the two aforesaid directions which are at right-angles to each other. On a helicopter, such a suspension means makes it possible to absorb into the fuselage the reaction of the main rotor torque, preventing rotation of the gear box, and making it possible to damp the vibrations via a flexible suspension offering considerable longitudinal and lateral flexibility, and therefore flexibility in any direction at right-angles to the axis of the rotor.

In a first form of embodiment, the two elements in each group of rotationally rigid connecting elements consist of rigid connecting rods articulated by their ends, the assembly of these two groups and the cross-member constituting an articulated system which is deformable vis-a-vis translatory movements. The two sets of translatory flexible connecting elements are then preferably each constituted by a pair of flexible and elastic studs working solely in compression respectively in one and the other of the orthogonal directions of movement. The four studs thus provided make it possible, by suitable choice of their characteristics, to regulate the flexibility in these directions to any independent values which may be the same or different, while it is likewise possible to lock the suspension in one or other of these directions by replacing the corresponding pair of flexible studs by a pair of rigid studs, all quite independently of the torque absorbing function which is provided solely by the articulated connecting rods and the floating cross-member. It will be noted that a pure torque affects only the articulated connecting rods and creates no deformation of the elastic studs which thus absorb only static and dynamic stresses in the plane of the plate and elastically limit the displacements of this latter.

In a second form of embodiment, the first element of each of the two groups of rotationally rigid connecting elements is no longer constituted by an articulated connecting rod but by a laminated block of known type, substantially incompressible in a direction corresponding to the transmission of torque, but elastically deformable in shear in a direction at right-angles corresponding to the second direction of translatory movement. Thus, these laminated blocks rigidly transmit the torque between the plate and the cross-member in a direction in which they are incompressible and bring about a flexible translatory connection in the shearing direction parallel with the second aforesaid direction of movement. Thus, each of these laminated blocks constitutes at once an element of rotationally rigid connection and an element of the second set of translatory flexible connecting elements, while the elements of the first set, constituted as in the first form of embodiment by flexible and elastic studs working solely in compression according to the first direction of movement, are preferably disposed between the cross-member and fixed mountings.

An assembly of mechanical stops may be provided to restrict the extent of the translatory movements of the plate in relation to the structure.

In a third form of embodiment, which is an alternative of the second form of embodiment in which the second set of flexible and elastic elements consists of laminated blocks which work elastically in shear, the second elements of the two rotationally rigid connecting assemblies are mixed with the two elements of the other flexible connecting set—in other words, the first set,—and are constituted by a pair of parallel arms disposed on either side of the plate, at right-angles to the axis and substantially parallel with the shearing direction of the laminated blocks, each of these arms, substantially incompressible in the direction of its length but capable of elastic flexion, being articulated at its ends at fixed points on the structure and, at an area adjacent to its central part, rigid with a corresponding end of the floating cross-member.

The joints in these flexible arms are preferably swivel joints. So that the lateral flexions of these arms are not impeded, it is advisable for one of the joints in each arm to co-operate with a sliding socket located at the end of the said arm.

Thus, the flexible studs associated with the floating cross-member and the pair of connecting rods for transmitting torque from this cross-member to the fixed structure, comprised in the first form of embodiment, are now replaced by a pair of arms which are longitudinally incompressible but laterally flexible which are advantageously made from high strength fibre laminate coated with thermosetting synthetic resin.

As a result of this, there are numerous advantages, particularly:

a saving in weight, because the connection to the fixed structure may be achieved by means of smaller mountings and because the connecting rods normally—of steel—are replaced by arms made from laminate, a less dense material;

a saving in manufacturing costs, because the mountings are of simpler form and the laminated arms require a well-known economical manufacturing technique which is widely used in the manufacture of blades (by moulding and polymerising under heat);

an improvement in effective life, because rubber studs are subject to ageing and to serious deterioration from splashes of synthetic oils, particularly in the case of helicopters. In contrast, arms made from laminated material are insensitive to oils even synthetic oils, and overcome the problems of ageing;

a flexibility in suspension which is independent of ambient temperature and which retains excellent properties even at extreme temperatures. Indeed, rubber studs harden when the temperature drops while the elastic properties of laminated arms do not alter.

In this third form of embodiment, the plate may advantageously be provided with a pair of members disposed symmetrically in relation to the axis and adapted to co-operate with a pair of fixed stops in order to limit the translatory movements of the plate at least in one direction of the plane thereof. In this case, there is an absolute limitation of the movements of the plate in relation to the fixed structure, particularly in the longitudinal direction of the fuselage in the case of a helicopter, which was not possible in the second form of embodiment.

The description which follows hereafter in which reference is made by way of non-limitative example to the accompanying drawings, will make it possible clearly to understand how the present invention can be put into practice. In the drawings:

FIG. 8 shows on an enlarged scale half the object in FIG. 7, while

Figure 1:
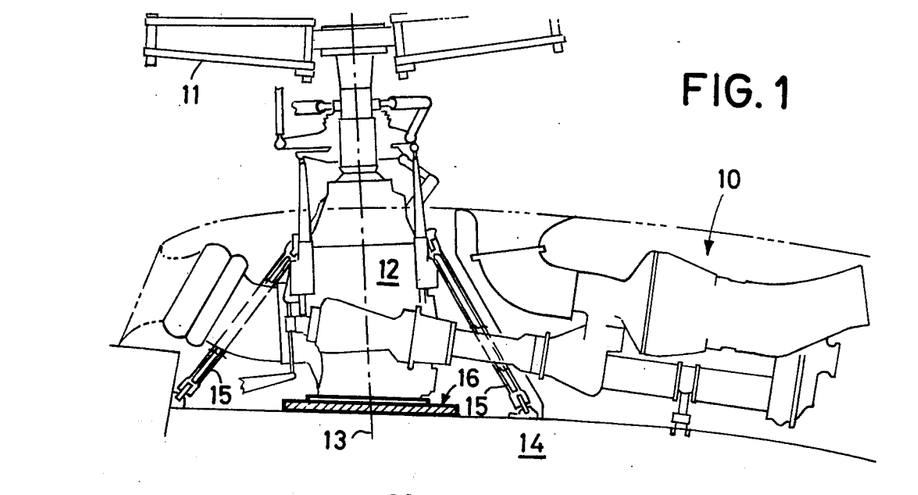
FIG. 1 shows part of a helicopter in lateral elevation and shows the location of a suspension means according to the invention.

Shown in FIG. 1 is the propulsive part of a helicopter located, in the present example, on the top of the fuselage 14. An engine 10 drives the main rotor 11 of the helicopter through a gear box 12 aligned on the axis 13 of the rotor 11. The gear box 12 is supported in known manner on the fuselage 14 of the helicopter by three or four oblique bars 15 forming the lateral edges of a pyramid having a triangular or rectangular base and they have clevises at their ends. Around their imaginary point of intersection, these bars provide a point of convergence for the movements of the gear box 12 and make it possible to absorb the supporting stresses generated by the rotor 11 along the axis 13 and the translatory stresses of the said rotor at right-angles to the said axis. The suspension means according to the invention is located in the shaded area 16, which is of narrow thickness, occupying the gap between the bottom of the casing of the gear box 12 and the upper part of the fuselage 14.

Figure 2:
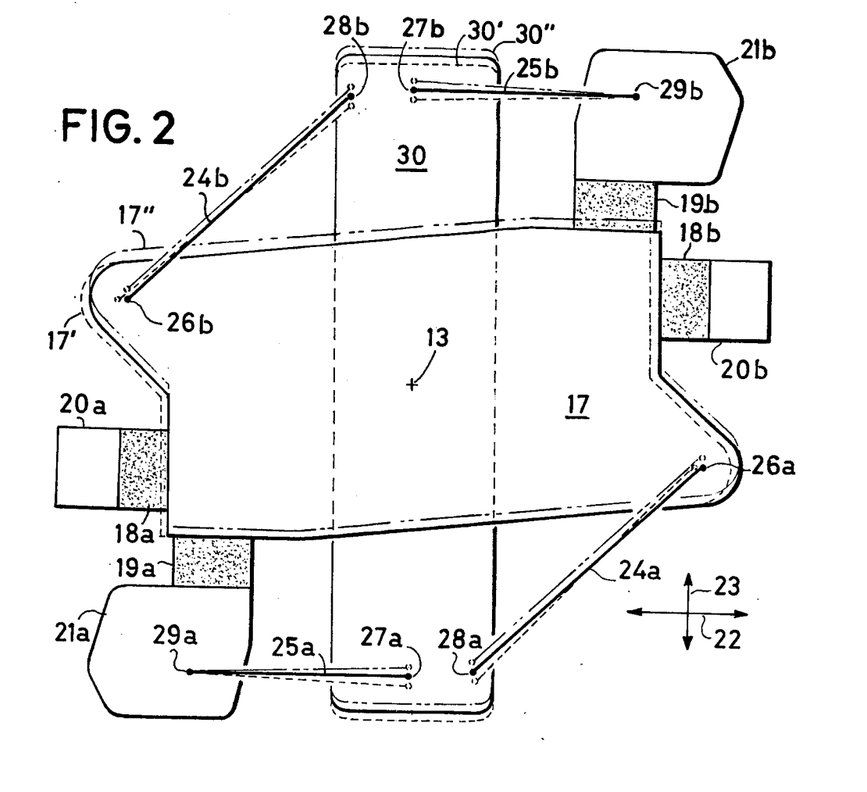
FIG. 2 shows in plan view and in diagrammatic and simplified form, a suspension means according to the invention, in a first form of embodiment.

In a first form or embodiment of the present invention (FIGS. 2 to 5), the bottom of the casing of the gear box 12 is rigid with a plate 17, the plane of which is substantially at right-angles to the axis 13. This plate is connected around its periphery to the structure of the fuselage 14 by a connecting assembly which is flexible in its translatory sense and which consists of two sets 18a, b, 19a, b of solid studs of flexible and elastic material working solely in compression and shown between mountings 20a, b, 21a, b fixed on the fuselage 14 and facing bearing surfaces provided on the plate 17. The two studs of each set 18a, b and 19a, b are identical and are disposed symmetrically in relation to the axis 13. Furthermore, as FIG. 2 shows, these studs are orientated in such a way that the set 18a, b allows the plate 17 to move in a first direction 22, for example the longitudinal direction of the fuselage 14, while the set 19a, b allows the plate 17 to move according to a second direction 23 which is at right-angles to the first, for example the transverse direction of the fuselage 14. Shown in broken lines in FIG. 2 is a position 17' of the plate after a movement in the direction 22 and in mixed lines, a position 17" of the plate after a movement in the direction 23.

It will thus be seen that the plate 17 is elastically suspended bi-directionally, and consequently in any direction of its plane in relation to the fuselage 14 which constitutes a fixed structure, which ensures damping of the vibrations from the gear box 12, preventing them from spreading from the gear box into the fuselage 14 of the helicopter. The small corresponding translatory movements give rise to slight rotations of the gear box 12 about the point of convergence of the bars 15.

In order to achieve absorption of the reactive torque emanating from the gear box 12, the plate 17 is furthermore connected to the fuselage 14 via a rotationally rigid connecting assembly which prevents the plate 17 and the gear box 12 from turning about the axis 13; however, as this assembly constitutes a deformable articulated system, it does not oppose the translatory movements corresponding to the vibrations. This assembly comprises two identical groups of rigid elements 24a, 25a and 24b, 25b disposed symmetrically in relation to the axis 13 and consisting of connecting rods disposed around the plate 17. The connecting rods 24a, b are parallel to each other and are articulated by their ends at diametrically opposed points 26a, b on the plate 17 and at likewise diametrically opposed points 28a, b on a floating intermediate cross-member 30 extending radially on either side of the axis 13 in a plane which is parallel with the plane of the plate 17 and at a small distance from this latter. The cross-member 30 connects the centres of the two groups of connecting rods 24a, 25a and 24b, 25b. For this purpose, the likewise parallel connecting rods 25a, b are articulated by their ends at diametrically opposed points 27a, b of the cross-member 30, adjacent to the points 28a, b and situated at the same distance as these latter points from the axis 13, the points 26a, b 28a, b and 27a, b being situated substantially on one and the same circle centred on the axis 13, and at fixed points 29a, b on the mountings 21a, b disposed in such a way that the connecting rods 25a, b are substantially tangent on the aforesaid circle.

As can be easily realised from examination of FIG. 2, this articulated system prevents any rotation of the plate 17 (and therefore of the gear box 12) about the axis 13, the cross-member 30 working either in compression or in extension according to the direction of the torque which is to be absorbed. On the other hand, it is deformable vis-a-vis translatory movements of the plate 17 both in the direction 22 and in the direction 23, the floating cross-member 30 then performing translatory movements according to its radial direction (positions 30', 30" of the cross-member 30 and the positions drawn respectively in broken lines and in mixed lines on the four connecting rods corresponding to the positions 17', 17" of the plate 17), while the elastic studs compress.

Figures 3, 4, 5:
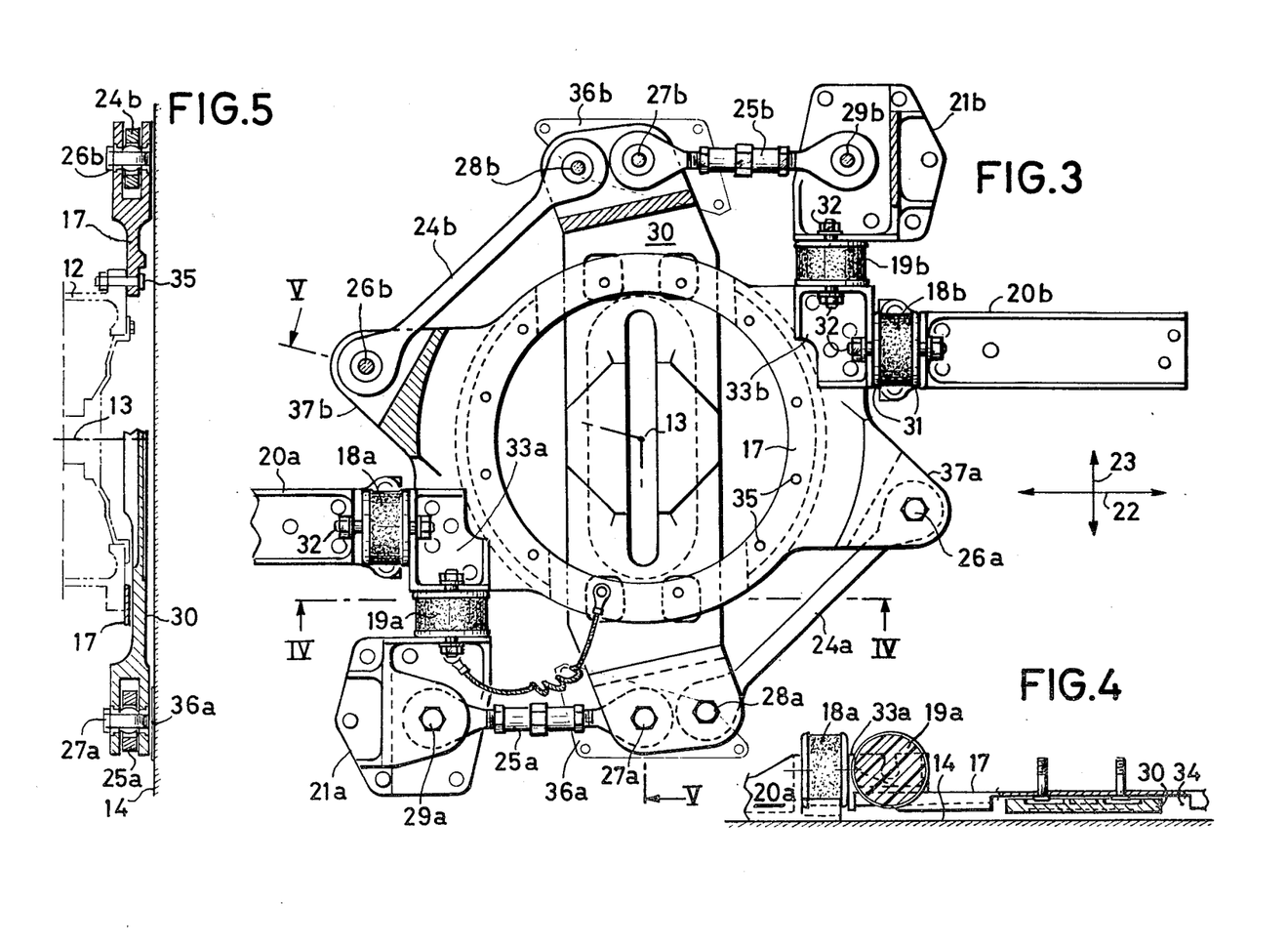
FIG. 3 is a plan, partly in section, of a practical embodiment of the means according to FIG. 2.
FIG. 4 shows a cross-section taken on the line IV—IV through FIG. 3.
FIG. 5 shows a cross-section on the line V—V through the object shown in FIG. 3.

FIGS. 3 to 5 show in greater detail how it is possible to carry into practice the form of embodiment of the invention which is shown diagrammatically in FIG. 2. These drawings show that the elastic studs 18a, b, 19a, b made for example from rubber or solid elastomer take the form of short cylinders of revolution and are provided with domes 31 carrying screws 32 for fixing to the fixed mountings and to corresponding members 33a, b fixed in diametrically opposed positions on the plate 17. The bearing faces of the studs 18a, b are at right-angles to the direction 22; those of the studs 19a, b are at right-angles to the direction 23. It is likewise evident that the floating cross-member 30 has a central flat part which is slightly remote from the wall of the fuselage 14, like the plate 17, and housed in a radial recess 34 provided below this latter. On either side of its flat part, the cross-member 30 has terminal clevises in which are fixed journals corresponding to articulation points 27a, b, 28a, b of the connecting rods. The plate 17 likewise has clevises 37a, b projecting radially and carrying the journals 26a, b as well as the members 33a, b for fixing the studs 18a, b, 19a, b, the journals 29a, b being carried by mountings 21a, b. The length of the connecting rods 25a, b can be adjusted by means of a screwthreaded adjusting sleeve. The bottom of the gear box 12 is fixed to the plate 17 by a ring of bolts 35. The bottom arm of each of the clevises of the cross-member 30 is capable of sliding on a thin fixed subjacent plate 36a, b. It will be noted that the four flexible studs are very easily accessible which makes it possible easily to replace any set of studs if they become worn or damaged.

The previously described embodiment produces a suspension offering considerable longitudinal and transverse flexibility and which makes it possible to achieve a very low level of vibration. When it is more particularly desirable to have different flexibility in the longitudinal direction from that which exists in the transverse direction, particularly to have a greater stiffness in this latter direction, it is possible to use a second form of embodiment of a suspension means according to the invention, shown diagrammatically in FIG. 6. In this drawing, the elements corresponding to elements of the first form of embodiment are identified by the same reference numerals, increased by 100. It will be seen that, in this form of embodiment, the rigid connecting assembly for absorbing the torque likewise has a floating cross-member 130 in a diametral situation, connected to fixed mountings 121a, b by a pair of connecting rods 125a, b which are identical, parallel and disposed on either side of a plate 117 symmetrically in respect of the axis 13. However, the connecting rods 24a, b are replaced in this case by laminated blocks 184a, b interposed between faces which are parallel inter se and with the direction 23 provided at the ends of the cross-member 130 and on radial projections 137a, b. These virtually incompressible laminated blocks rigidly transmit the reaction from the torque of the plate 117 to the cross-member 130, as do the connecting rods 24a, b. Furthermore, they provide an elastic connection of the plate 117 according to the direction 23, for example the transverse direction in relation to the fuselage. Indeed, they have a shearing elasticity in the direction of the surfaces of the sheets of which they are composed, which extend parallel with the direction 23. Elastic suspension in the direction 22, for example the longitudinal direction of the fuselage, is provided by a set of flexible studs 118a, b working solely in compression and similar to the studs 18a, b of the first form of embodiment. However, this set of studs in this case comprises two pairs of studs working in opposition. The two studs 118a, like the two studs 118b, are interposed between the inner faces of terminal forks 100a, b of the cross-member 130, these faces being perpendicular to the direction 22, and a central part 101a, b provided on fixed mountings 120a, b. Thus, as in the first form of embodiment, there is between the plate 117 and the fuselage 14 constituting the fixed structure a rigid connection for rotation about the axis 13 (thanks to the laminated blocks 184a, b which are incompressible and the connecting rods 125a, b), and a flexible translatory connection for movement in the directions 22, 23 which are at right-angles to each other, therefore in any direction (thanks to the laminated blocks 184a, b which are elastic in shear and to the studs 118a, b which are elastic in compression).

Displacement of the plate 117 and of the floating cross-member 140 in the direction 22 may be limited by stops 102a,b provided at the ends of the cross-member 130 and co-operating with the end of the central part 101a, b of the mounting 120a, b. Displacement of the plate 117 in the direction 23 may be limited by stops 103a, b provided at the end of the projections 137a, b of the said plate and co-operating with oppositely disposed faces located at right-angles to the direction 23 and provided on the cross-member 130, which cannot move in the direction 23 but only in the direction 22, on account of the connecting rods 125a, b disposed parallel with the direction 23. This assembly of mechanical stops, in limiting displacement, guarantees safety in flight in the event of elastic suspension elements failing. The relative situation of the plate 117 and of the cross-member 130 in relation to the fixed structure and according to the direction of the axis 13 may be determined by thin plates 104a, b and 105a, b connected to the cross-member 130 and respectively flanking the stops 103a, b and the end of the central parts 101a, b of the mountings 120a, b as FIG. 6 shows.

Figure 6:
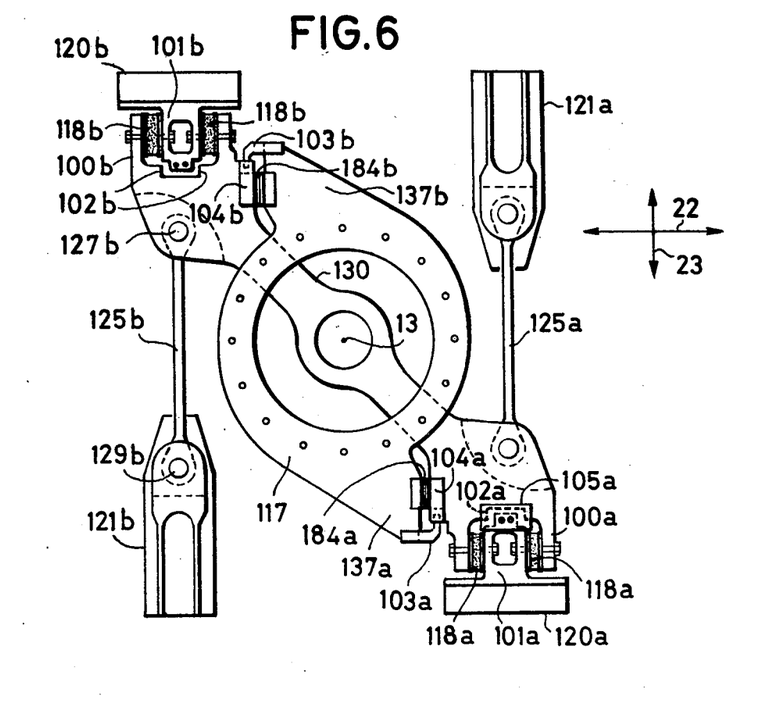
FIG. 6 diagrammatically shows in plan view the means according to the invention, in a second form of embodiment.

An alternative form of the second embodiment illustrated in FIG. 6 is shown in FIGS. 7 to 10. This third form of embodiment comprises (FIG. 7) a plate 117, the plane of which is substantially at right-angles to the axis 13 of the main rotor of the helicopter on which the suspension means is mounted. The main gear box (not shown) is fixed by its bottom to the plate 117; it is furthermore supported by oblique bars on the fuselage of the helicopter.

Figure 7:
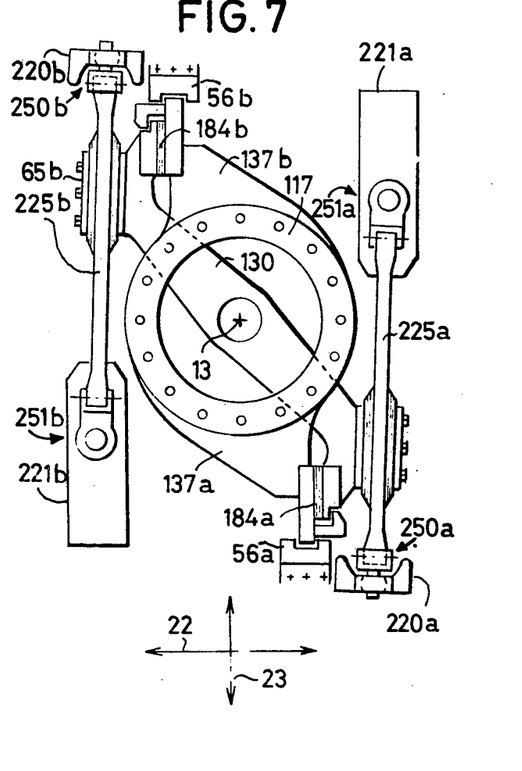
FIG. 7 diagrammatically shows a plan view of the means according to the invention, in a third form of embodiment.
Figure 8:
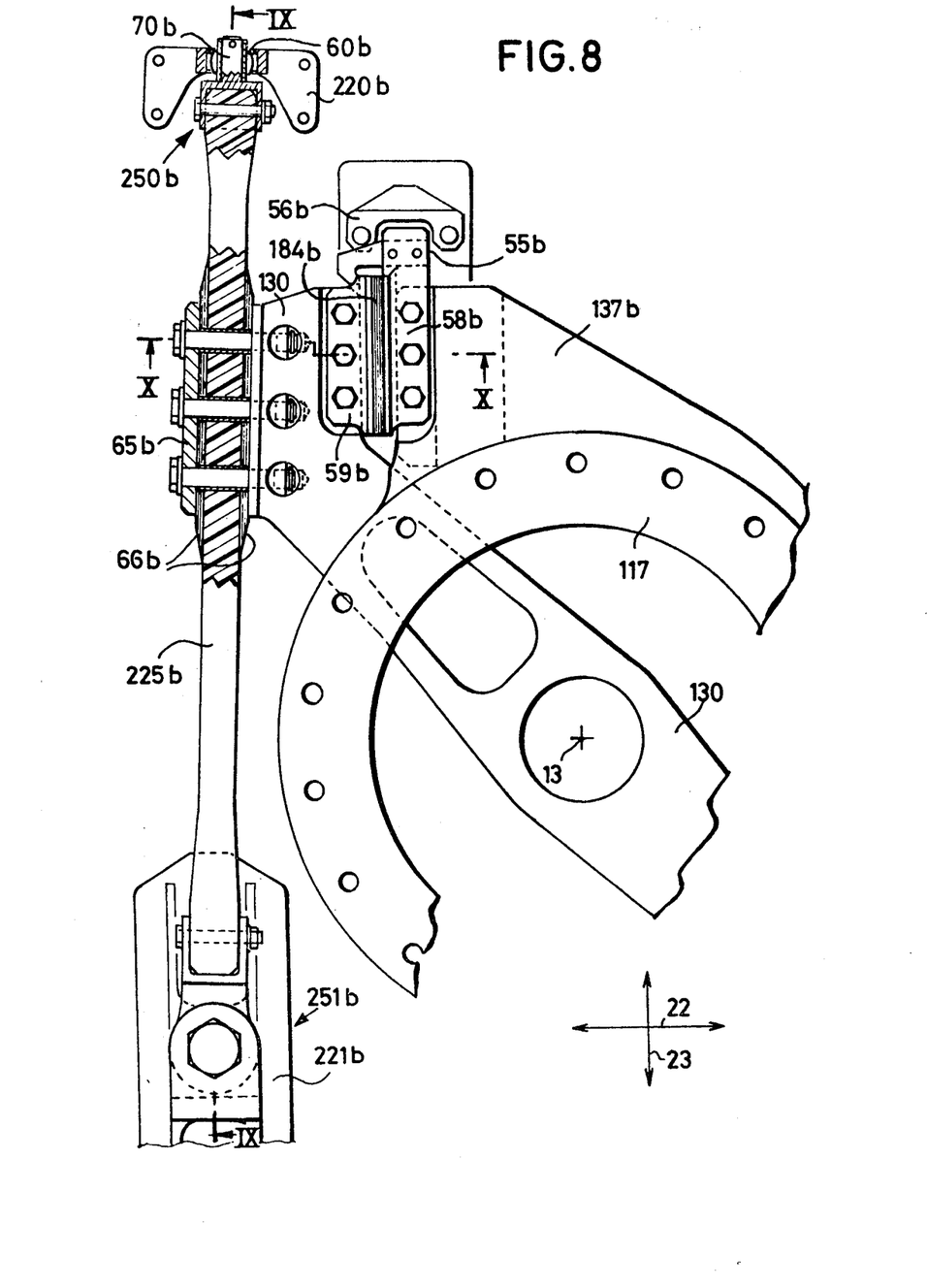
Figure 9:
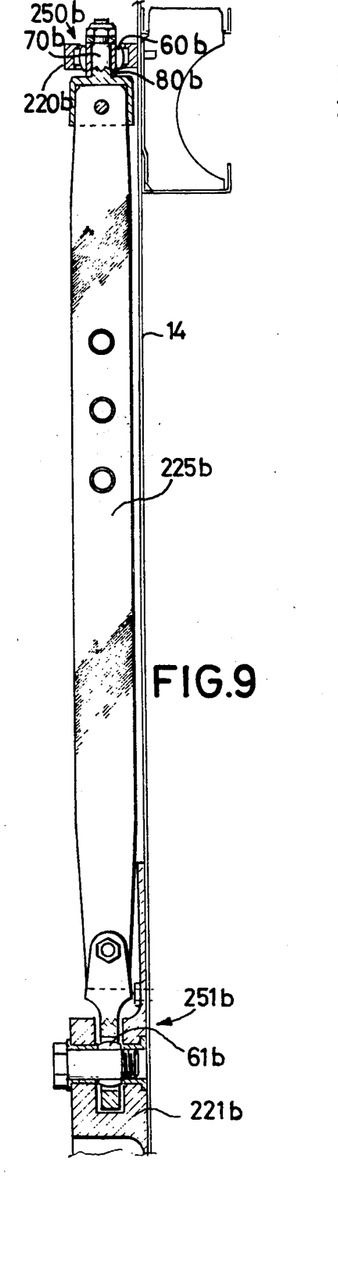
FIGS. 9 and 10 show cross-sections taken respectively on the lines IX—IX and X—X in FIG. 8.

There is placed between the plate 117 and the structure of the helicopter an assembly of elements ensuring on the one hand rotationally rigid connection for conveying the torque from the rotor and on the other a flexible connection allowing translatory movement in the two perpendicular directions 22 and 23 (respectively longitudinal and transverse), therefore in any direction of the plane of the plate 117.

At each end of a floating cross-member 130 extending radially on either side of the axis 13, there is mounted, between bearing faces which are parallel inter se, and with the direction 23, belonging respectively to the cross-member 130 and to a radial projection 137a, b on the plate 117, a laminated block 184a, b. These laminated blocks which are practically incompressible in the direction 22 at right-angles to their constituent sheets, rigidly transmit to the cross-member 130 the reactive torque emanating from the plate 117. Then, from this latter, the torque is absorbed by the structure 14 of the helicopter by virtue of longitudinally incompressible arms 225a, b substantially parallel inter se and with the direction 23. These arms, disposed in the plane of the plate 117 symmetrically in relation to the axis 13, are articulated at their ends on mountings 220a, b and 221a,b fixed to the structure 14. Each end of the cross-member 130 is bolted to be rigid with the corresponding arm 225a, b in a region adjacent to the central part thereof.

Thus, the reactive torque is rigidly transmitted to the fixed structure through laminated blocks 184a, b, the ends of the cross-member 130 and arms 225a, b which apply corresponding forces to the mountings 221a, b, these latter constituting fixed points for absorption of compressive stesses in the axis of the said arms.

The flexible connection allowing translatory movement of the plate 117 is provided by the same elements, in other words by laminated blocks 184a, b and arms 225a, b. Indeed, the laminated blocks offer an elasticity in shear in the direction of the surfaces of their constituent sheets and therefore allow displacement of the plate 117 in the direction 23. Furthermore, the arms 225a, b are flexible and allow the cross-member 130 and therefore the plate 117 to move in the direction 22. The corresponding deformations in flexion of the said arms are allowed by articulations 250a, b and 251a, b by which they are connected to the fixed mountings 220a, b and 221a, b. These articulations in effect comprise swivel joints, respectively 60a,b and 61a, b, these swivel joints allowing the ends of the arms to perform angular movements about respective fixed axes parallel with the axis 13, so that the arms are capable of bending by flexing elastically under the effect of stresses originating from the plate 117 and orientated in the direction 22.

In greater detail, the arms are articulated directly by swivel joints 61a, b on mountings 221a, b. At their other end, the arms terminate in a metal ferrule 70a, b which is cylindrical and which is enclosed by a sleeve 80a, b sliding in the corresponding swivel joint 60a, b and allowing absorption of shearing stresses in the flexible arm and free axial sliding of its corresponding end when it flexes under the stresses it receives from the cross-member 130.

The means described in this third form of embodiment operates as follows: the plate 117, fixed under the bottom of the main gear box of the helicopter is subject, in its plane, on the one hand to considerable torque corresponding to the bearing reaction of the fuselage of the driving torque of the rotor via the engine of the aircraft and, on the other, to static and dynamic stresses created by the rotor while it is functioning. This torque and these stresses are transmitted from the plate 117 to the floating cross-member 130 through laminated blocks 184a, b working in compression, which work also in shear to absorb transverse stresses in the direction 23. The floating cross-member, rigid with the parallel flexible arms transmits to these latter the longitudinal stresses according to the direction 22, causing them to flex elastically and, furthermore, the stresses corresponding to absorption of the torque and exerted on the arms in compression according to the direction of their length.

Consequently, the bottom of the gear box has, compared with the structure of the helicopter, opportunity for limited movement with elastic return in longitudinal and transverse directions, while the engine torque is transmitted without the gear box being able to rotate. Thus, there is effective filtering of the vibratory stresses generated by the main rotor in its plane and in any direction at right-angles to the axis of the said rotor.

Here, the suspension means has been described with flexible arms working axially in compression; it is obvious that the said arms may likewise be disposed to work axially in traction, with a corresponding adaptation of the swivel joints.

A system of stops interposed between the projections 137a and 137b of the plate 117 and the structure of the helicopter absolutely limits the extreme movements of flexion of the arms and constitutes for the whole of the suspension means a safety support if the static and dynamic stresses arising during flight are exceeded.

This system of abutments comprises two members 55a, b (FIG. 8) which are fixed to the projections 137a, b of the plate 117 and of which the outer ends extend into a fixed U-shape mounting 56a, b and co-operate therewith to restrict longitudinal displacements of the plate 117 in the direction 23. The members 55a, b are likewise capable of co-operating with the bottom of the mountings 56a, b to limit transverse displacements in the direction 22, likewise in relation to the structure of the helicopter.

Figure 10:
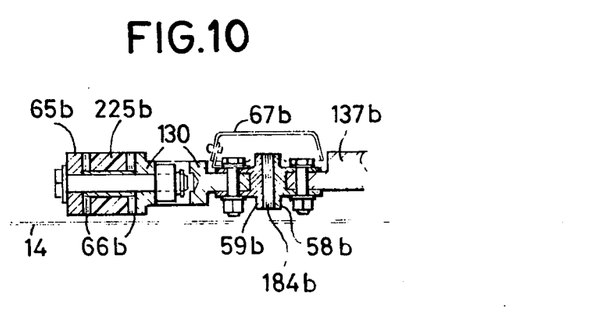

The flexible arms 225a, b preferably have a rectangular cross-section, as FIG. 10 shows. They are constructed from high strength (glass or carbon) fibre laminates coated in a heat-hardened synthetic resin in order to offer a certain lateral flexibility and satisfactory axial rigidity, that is to say virtual incompressibility in their longitudinal direction even under a considerable loading.

As can be seen in FIG. 7, the whole of the suspension means is entirely symmetrical in relation to the axis 13, as in the first two forms of embodiment.

FIG. 10 shows the detail of the connections between the plate 117 and the arm 225b. It shows the laminated block 184b interposed between two members 58b, 59b offering the aforementioned bearing surfaces—the stop member 55b (FIG. 8) consists of an extension of the member 58b—bolted respectively to the projection 137b and to the end of the cross-member 130. The arm 225b is gripped and bolted between this end and an anchor plate 65b, with an interposed laminated reinforcement 66b. A protective cover 67b covers the laminated block 184b and the associated members 58b, 59b.

I claim:

1. A multidirectional suspension system for a member carried by a support in a fixed structure, the member being subject to torque about an axis of rotation and to static and dynamic stresses in directions perpendicular to said axis, said suspension system absorbing the torque into the fixed structure and providing an elastic connection between the said member and the fixed structure so as to transmit static stresses and simultaneously dampen vibration, said suspension system comprising:
  a baseplate fixed to said member for conjoint movement therewith and situated in a plane substantially perpendicular to said axis of rotation, said baseplate having a pair of diametrically opposed radially extending shoulders,
  a rigid cross member extending diametrically between the shoulders of said baseplate and disposed freely between said baseplate and said fixed structure,
  two sets of first and second fittings secured to the fixed structure and disposed symmetrically on opposite sides of said baseplate in association with said respective shoulders, and in proximity to the respective ends of said cross member,
  said shoulders and said first fittings having paired bearing surfaces extending parallel to a first direction perpendicular to the axis of rotation, said shoulders and said second fittings having paired bearing surfaces extending parallel to a second direction perpendicular to both the axis of rotation and said first direction,
  resilient compression means secured between each of said paired bearing surfaces permitting translatory deflection of said baseplate in each of said first and second directions,
  first link rods articulatingly connecting each end of said cross member with the first fitting in the set of fixed fittings proximate thereto,
  second link rods extending opposite to said first link rods and articulatingly connecting each of the ends of the cross member and said baseplate adjacent the shoulder associated with the set of fittings remote from the end of said cross member, said link rods being adapted to resiliently inhibit said baseplate from rotating about said axis and being articulatable during translatory movement.

2. The system according to claim 1, in which the said cross member is situated in a plane parallel to, and spaced a short distance from the plane of the said rigid plate.

3. The system according to claim 1 or 2, in which each of the second link rods is articulated at its ends on the one hand to the crosspiece at a point close to the point of articulation of the first link rod which connects said cross member to said first fitting, and on the other hand to a radial projection on the rigid plate, the points of articulation of said link rods on said cross member and said radial projection being substantially equidistant from the axis of rotation.

4. The system according to claim 1, wherein at least one of said first and second link rods are adjustable in length.

5. The system according to claim 1, wherein said compression means comprises a cylindrical elastic member having a stud extending therethrough for fastening to the associated bearing surfaces, said stud being provided with fasteners to limit the extent of compression and expansion of said elastic member.

6. A multidirectional suspension system for a member carried by a support in a fixed structure, the member being subject to torque about an axis of rotation and to static and dynamic stresses in directions perpendicular to said axis, said suspension system absorbing the torque into the fixed structure and providing an elastic connection between the said member and the fixed structure so as to transmit static stresses and simultaneously dampen vibration, said suspension system comprising:
- a baseplate fixed to said member for conjoint movement therewith and situated in a plane substantially perpendicular to said axis of rotation, said baseplate having a pair of diametrically opposed radially extending shoulders,
- a rigid cross member extending diametrically between the shoulders of said baseplate and disposed freely between said baseplate and said fixed structure,
- bearing means mounted between each of the shoulders of said baseplate and said cross member being shearable in a first direction perpendicular to the axis of rotation, and incompressible in a second direction perpendicular both to said first direction and said axis of rotation,
- two sets of first and second fittings secured to said fixed structure and deposed symmetrically on opposite sides of said baseplate, said first and second fittings in each set being aligned respectively in parallel to said first direction,
- whereby said baseplate is resiliently inhibited from rotation and translatorily movable in said first and second directions.

7. The system according to claim 6, wherein said shear means comprises a laminate assembly of blocks of rigid material.

8. The system according to claim 6 or 7, including stop means to limit the shear deflection of said laminate block.

9. The system according to claim 6 or 7, wherein each of the ends of said cross member is bifurcated and straddles said associated second fitting and resilient compression means, working in opposition to each other, is mounted between each arm of the bifurcated end and the associated fitting.

10. The system according to claim 9, wherein said compression means comprises a cylindrical elastic member having a stud extending therethrough for fastening to the associated arms and fittings, said stud being provided with fasteners to limit the extent of compression and expansion of said elastic member.

11. A multidirectional suspension system for a member carried by a support in a fixed structure, the member being subject to torque about an axis of rotation and to static and dynamic stresses in directions perpendicular to said axis, said suspension system absorbing the torque into the fixed structure and providing an elastic connection between the said member and the fixed structure so as to transmit static stresses and simultaneously dampen vibration, said suspension system comprising:
- a baseplate fixed to said member for conjoint movement therewith and situated in a plane substantially perpendicular to said axis of rotation, said baseplate having a pair of diametrically opposed radially extending shoulders,
- a rigid cross member extending diametrically between the shoulders of said baseplate and disposed freely between said baseplate and said fixed structure,
- bearing means mounted between each of the shoulders of said baseplate and said cross member being shearable in a first direction perpendicular to the axis of rotation, and incompressible in a second direction perpendicular both to said first direction and said axis of rotation,
- two sets of first and second fittings secured to said fixed structure and deposed symmetrically on opposite sides of said baseplate, said first and second fittings in each set being aligned respectively in parallel to said first direction,
- a link rod extending parallel to said first direction and articulatingly connected at each of its ends to the respective first and second fittings in each set, said rod being substantially incompressible in its longitudinal direction and flexible transversely substantially in said second direction, and
- means for securing the ends of said cross member to said link rods medial of its ends,
- whereby said baseplate is inhibited from rotation and movable translatorily in said first and second directions.

12. The system according to claim 11, wherein the articulating connection of at least one end of said link rod and the associated fitting is a ball joint cooperating with a ferrule.

13. The system according to claim 11 or 12, wherein said link arms comprise a laminate assembly of high strength fibers coated with synthetic thermo setting resin.

14. The system according to claim 11, including stop means adapted to engage said baseplate to limit translatory movement thereof.

* * * * *